United States Patent
Bachl et al.

(10) Patent No.: US 7,738,905 B2
(45) Date of Patent: Jun. 15, 2010

(54) DYNAMIC POWER ALLOCATION FOR UNICAST-MULTICAST SUPERPOSITION IN WIRELESS BROADCASTING

(75) Inventors: Rainer Bachl, Nuremberg (DE); Angel Lozano, Hoboken, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 679 days.

(21) Appl. No.: 11/625,463

(22) Filed: Jan. 22, 2007

(65) Prior Publication Data

US 2008/0176593 A1    Jul. 24, 2008

(51) Int. Cl.
*H04B 7/00* (2006.01)
(52) U.S. Cl. .......................... 455/522; 455/68; 455/69; 455/70; 455/503
(58) Field of Classification Search ............... 455/522, 455/67.11, 68–70, 115.3, 127.1, 135, 226.3, 455/277.2, 452.2, 161.3, 503; 370/318
See application file for complete search history.

(56) References Cited

U.S. PATENT DOCUMENTS

| | | | |
|---|---|---|---|
| 7,610,020 B2 * | 10/2009 | Jokinen et al. ............... | 455/69 |
| 2002/0085645 A1 * | 7/2002 | Hadad et al. ................. | 375/285 |
| 2002/0160800 A1 * | 10/2002 | Rozmaryn .................. | 455/522 |
| 2004/0127216 A1 | 7/2004 | Fukushima ............... | 455/432.2 |
| 2004/0161050 A1 * | 8/2004 | Larsson et al. .............. | 375/267 |
| 2005/0096079 A1 * | 5/2005 | Choi et al. ................... | 455/522 |
| 2005/0232292 A1 * | 10/2005 | Richards et al. ............. | 370/432 |
| 2006/0007930 A1 * | 1/2006 | Dorenbosch ................ | 370/390 |
| 2009/0036140 A1 * | 2/2009 | Yahagi ....................... | 455/450 |

FOREIGN PATENT DOCUMENTS

| GB | EP 1 734 684 A1 | 12/2006 |
|---|---|---|
| WO | WO 2006/052565 A2 | 5/2006 |

OTHER PUBLICATIONS

International Search Report and Written Opinion mailed Jul. 24, 2008.
Farooq Khan, *Broadcast Overlay on Unicast via Superposition Coding and Interference Cancellation*, IEEE 2006.
XP-002487521, 3GPP TSG RAN WG1 Meeting #47bis, Sorrento, Italy, Jan. 15-19, 2007, Samsung, "*Performance of Frequency Multiplexing for Broadcast and Unicast*".
XP-002487522, 3GPP TSG RAN WG1 Meeting #44, Denver, USA, Feb. 13-17, 2006, Samsung, "*Multiplexing of Broadcast and Unicast Traffic*."

* cited by examiner

*Primary Examiner*—Duc Nguyen
*Assistant Examiner*—Dominic E Rego
(74) *Attorney, Agent, or Firm*—Williams, Morgan & Amerson, PC

(57) ABSTRACT

The present invention provides a method for supplying unicast and multicast transmissions to a plurality of mobile devices in a wireless system. The method comprises supplying a multicast signal using a first portion of total available power, wherein the first portion of total available power is a function of a channel quality indicator associated with at least one of the mobile devices. Thereafter, a unicast signal is supplied using a second portion of total available power, wherein the second portion of total available power is a function of the first portion of total available power.

9 Claims, 4 Drawing Sheets

DYNAMIC POWER ALLOCATION FOR UNICAST-MULTICAST SUPERPOSITION IN WIRELESS BROADCASTING

BACKGROUND OF THE INVENTION

1. Field of the Invention

This invention relates generally to communication systems, and, more particularly, to wireless communication systems.

2. Description of the Related Art

Conventional wireless communication systems include one or more base stations, which may also be referred to as node-Bs, for providing wireless connectivity to one or more mobile units, which may also be referred to using terms such as user equipment, mobile devices, subscriber equipment, and access terminals. Exemplary mobile units include cellular telephones, personal data assistants, smart phones, text messaging devices, laptop computers, desktop computers, and the like. Each base station may provide wireless connectivity via Radio Frequency (RF) signals to one or more mobile units in a geographical area, or cell, associated with the base station. For example, a base station that operates according to a Universal Mobile Telecommunication System (UMTS) protocol may provide wireless connectivity to one or more mobile units in a cell associated with the base station over a wireless communication link.

The wireless communications link typically includes the ability to deliver information to each of the access terminals using both, or either, multicast and/or unicast transmissions. Typically, a unicast transmission is directed to a single access terminal, whereas a multicast transmission is directed to a plurality of access terminals. Typical multicast applications include the transmission of television signals, radio, audio and video streaming, stock valuations, news summaries, etc. Unicast applications include a typical voice communication session, an Internet session, an instant message session, and the like. In every cell, a single multicast signal is transmitted for all the active users while multiple unicast signals are transmitted individually to each of them.

Superposition coding can be used to multiplex the multicast and unicast signals. That is, the multicast and various unicast signals are superimposed in an orderly fashioned. A simplified version of this technique has recently been proposed and is under discussion for possible adoption in several wireless standards. In this simplified version, the unicast signals are multiplexed in time and/or frequency (i.e., orthogonally rather than superimposed) and only the multicast signal is superimposed thereupon, as is stylistically represented in FIG. 1. On each time/frequency resource, the transmission consists therefore in a superposition of the multicast signal and of a single unicast signal. Arbitrary modulation formats may be used for the multicast and unicast signals.

There are significant differences between the multicast and unicast traffic. For example, the multicast signal is encoded at a fixed rate, established a priori with a goal of ensuring successful decoding in a majority of locations (e.g., 90% to 95%). Furthermore, the multicast signal is often sent synchronously from all the transmission sites in the system and the rate and modulation format is common to all so as to enable constructive combining at the user terminals. The unicast signals, on the other hand, are encoded at variable rates that depend on the channel and interference conditions to the respective user receivers. Such rates may then, in general, be different at each time/frequency resource.

Each user decodes the multicast signal first. If the decoding is successful, it then proceeds to cancel out the contribution of the multicast signal and to further decode the superimposed unicast signal. Since the multicast signal is decoded with interference from the unicast signal, the former must be sufficiently strong with respect to the latter. The total power available for transmission of both the multicast and unicast signal is denoted by $P_T$. The fraction of $P_T$ that is allocated to multicasting is denoted as $\alpha$. Thus, the multicast transmit power is $\alpha P_T$ and the available unicast transmit power is $(1-\alpha)P_T$. The standard approach is to use a static $\alpha$ and to account for resulting level of unicast interference when determining the multicast encoding rate.

However, the amount of power required to transmit the multicast signal to the various mobile devices intended to receive the multicast transmission may vary significantly over time. That is the various mobile devices may relocate to a position in which conditions are more conducive such that transmissions need not be as strong. However, given the static $\alpha$, current systems will continue to transmit at the same power level, unnecessarily limiting the power that may be used for the unicast transmissions.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for supplying unicast and multicast transmissions to a plurality of mobile devices in a wireless system. The method comprises supplying a multicast signal using a first portion of total available power, wherein the first portion of total available power is a function of a channel quality indicator associated with at least one of the mobile devices. Thereafter, a unicast signal is supplied using a second portion of total available power, wherein the second portion of total available power is a function of the first portion of total available power.

In another embodiment of the present invention, a method is provided for supplying unicast and multicast transmissions to a plurality of mobile devices in a wireless system. The method comprises periodically allocating power between the unicast and multicast transmissions as a function of a channel quality indicator associated with at least one of the mobile devices.

BRIEF DESCRIPTION OF THE DRAWINGS

The invention may be understood by reference to the following description taken in conjunction with the accompanying drawings, in which like reference numerals identify like elements, and in which.

Figure 1:
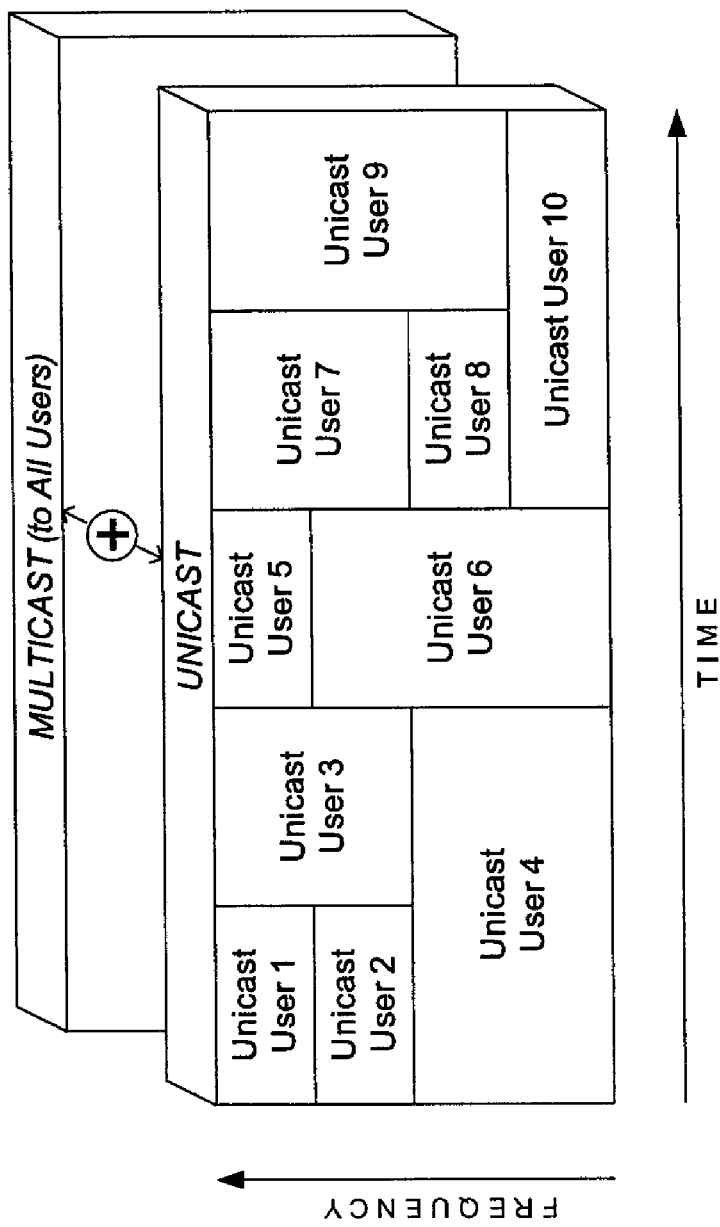
FIG. 1 conceptually illustrates one exemplary embodiment of a wireless communications system that superimposes multicast and unicast signals.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation may be described in this specification. It may be appreciated that in the development of any such actual embodiment, numerous implementation-specific decisions may be made to achieve the developers' specific goals, such as compliance with system-related and business-related constraints, which may vary from one implementation to another. Moreover, it may be appreciated that such a development effort might be complex and time-consuming, but may nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, in one embodiment of the instant invention, a method for dynamically adjusting the power allocated to multicast transmissions is described. The method effectively utilizes actual locations of the mobile devices to increase the unicast data rate while preserving the multicast coverage requirements.

Figure 2:
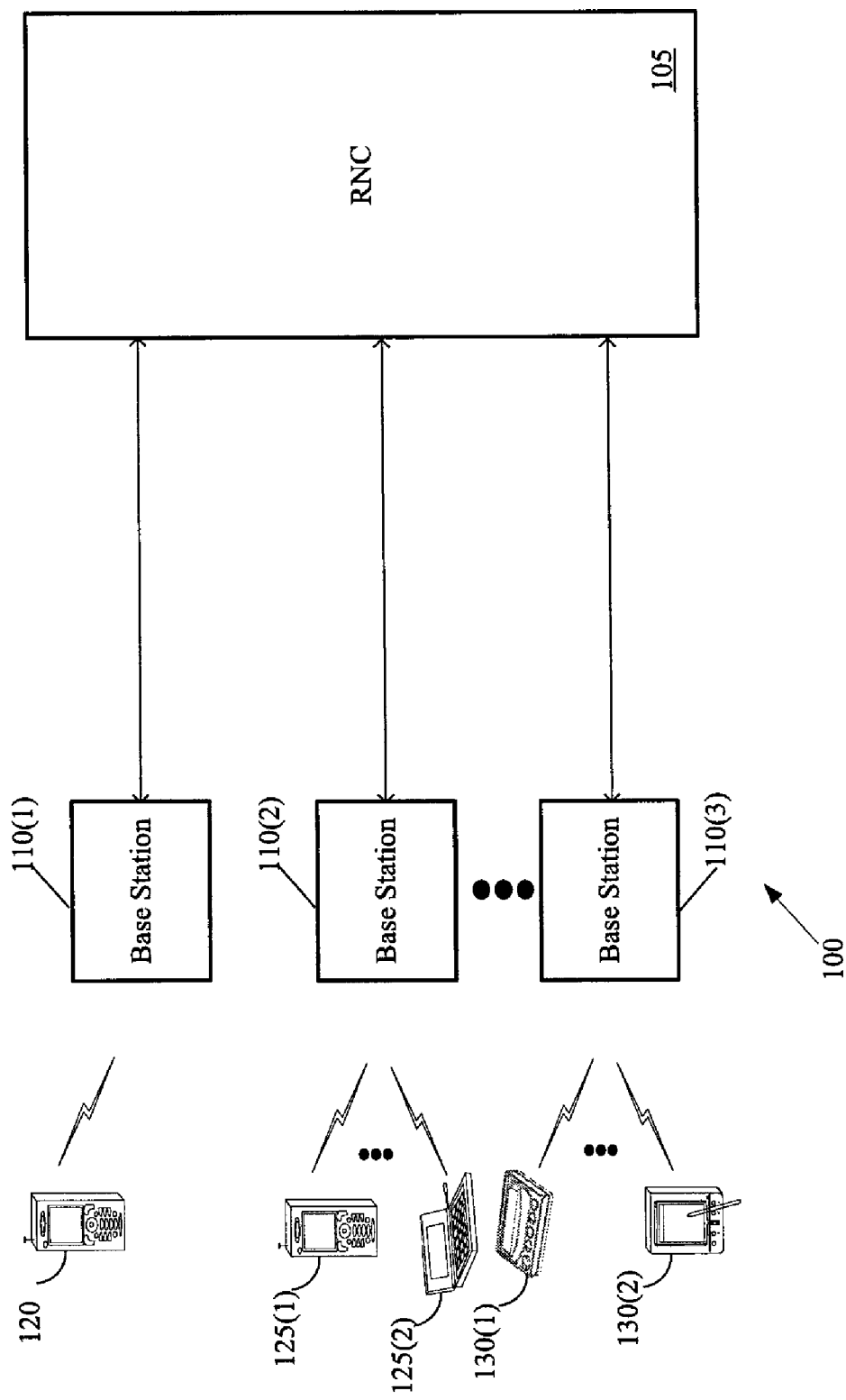
FIG. 2 conceptually illustrates one exemplary embodiment of a wireless communication system, in accordance with the present invention.

FIG. 2 conceptually illustrates one exemplary embodiment of a communication system 100. In the illustrated embodiment, the communication system 100 is a wireless communication system including a radio network controller 105. The communication system 100 and the radio network controller 105 may operate according to Universal Mobile Telecommunication Services (UMTS) protocols and may implement Orthogonal Frequency Division Multiple Access (OFDMA). However, persons of ordinary skill in the art having benefit of the present disclosure should appreciate that the present invention is not limited to communication systems that operate according to UMTS and/or OFDMA. In alternative embodiments, the communication system 100 may operate according to one or more other protocols including, but not limited to, the Global System for Mobile communication (GSM), Code Division Multiple Access (CDMA, CDMA 2000), and the like.

The radio network controller 105 is communicatively coupled to base stations 110(1-2). The indices (1-2) will be used hereinafter to refer to individual base stations and/or subsets of base stations. However, in the interest of clarity, the indices (1-2) may be dropped when the base stations 110 are referred to collectively. This convention will also be applied hereinafter to other elements that are referred to using a single reference number and one or more indices. The base stations 110 may provide wireless connectivity to corresponding geographical areas or cells. As discussed above, the base stations 110 may provide wireless connectivity according to UMTS protocols and may implement OFDMA, but the base stations 110 are not limited to these protocols. In the illustrated embodiment, the base station 110(1) provides wireless connectivity to a mobile unit 120, the base station 110(2) provides wireless connectivity to mobile units 125(1-2), and the base station 110(3) provides wireless connectivity to the mobile units 130(1-2). However, persons of ordinary skill in the art having benefit of the present disclosure should appreciate that the base stations 110 may provide wireless connectivity to any number of mobile units at any location within or proximate to the cells.

Figure 3:
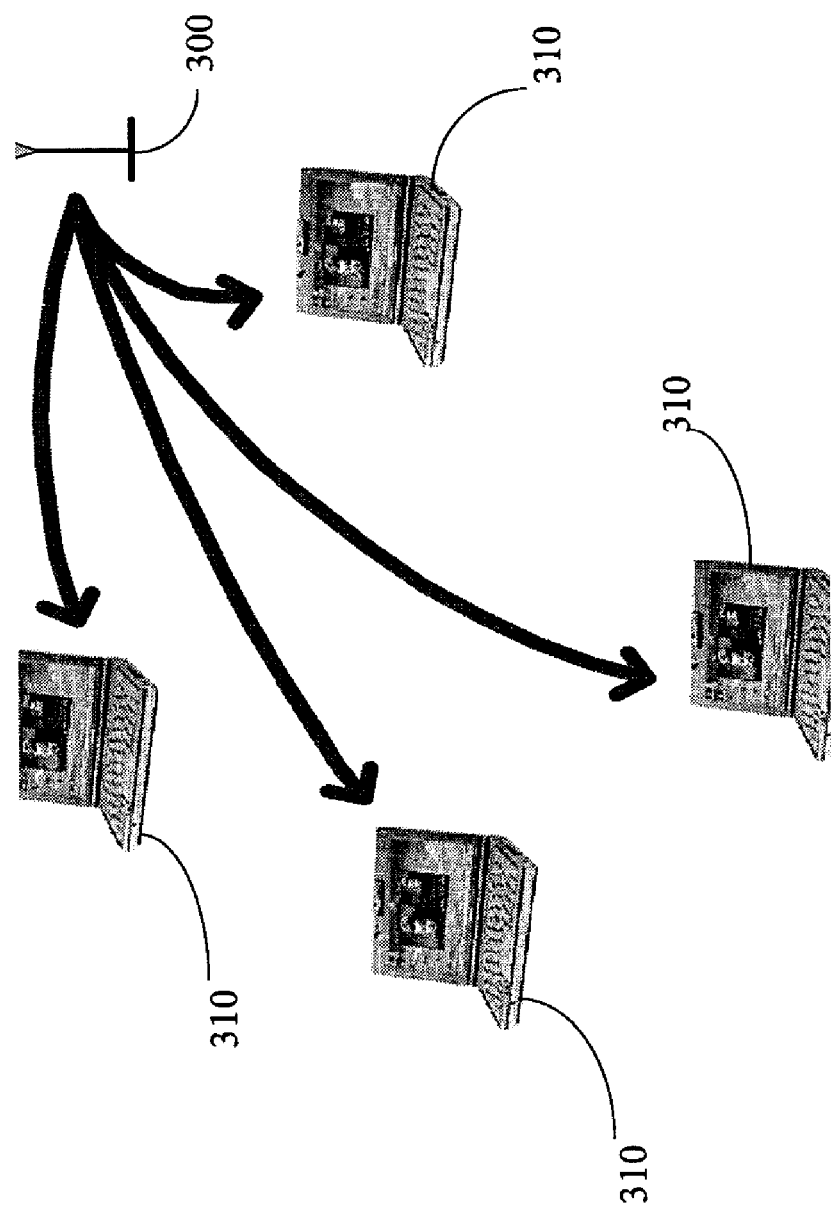
FIG. 3 conceptually illustrates one exemplary embodiment of a base station and a plurality of mobile devices employing aspects of the instant invention.

Turning now to FIG. 3, consider an individual base station 300 of the type described above in conjunction with base stations 110 and the K mobile devices 310 that are connected to it. Those skilled in the art will appreciate that the mobile devices 310 may be employing super position to receive the multicast signal from multiple nearby base stations (not shown in FIG. 2). Thus, while the multicast signal broadcast by the base station 300 may, by itself, be inadequate, the aggregate signals received from the other nearby base stations (not shown in FIG. 2) may be sufficient. Thus, in some applications, it may be useful to define the connection on the basis of the unicast traffic transmission, as opposed to the multicast traffic transmission. For purposes of illustrating the instant invention, assume that the entire transmit power is allocated to the multicast signal, i.e., $\alpha=1$. Given the channel conditions between the base station 300 and the K mobile devices 310, and given the predetermined multicast rate:

some (typically a majority) of the mobile devices 310 will be able to decode the multicast signal; and a few users may not be able to decode it. Such users are in outage and cannot be aided by the system.

Denote by $k_0$ the user that, among all those that can decode the signal, has the worst received signal as measured by a quality metric, such as a long-term quality metric, including, but not limited to, a signal-to-interference-and-noise ratio (SINR), bit error rate (BER), block error rate (BLER) or some other long-term channel quality indicator (CQI). Denote by $\gamma(k_0)$ a measure of the received signal quality that monotonically increases with the received SINR, or monotonically decreases with the BER or BLER. Further denote by $\gamma_{min}$ the long-term CQI required to decode the multicast signal on the basis of its encoded rate.

If some of the transmit power is reallocated from multicast to unicast, thereby reducing $\alpha$, the average quality of the received multicast signal for all the users will diminish. However, as long as $\gamma(k_0)$ does not fall below $\gamma_{min}$ the multicast performance is unaltered. Hence, the term $\Delta=\max(0,\gamma(k_0)-\gamma_{min})$ corresponds to a level of excess power that can be at least partially reallocated to the unicast component with no significant multicast degradation. The excess power that is targeted for actual reallocation to the unicast component is denoted as $g(\Delta)$, whereby the function $g(\cdot)$ also accounts for the fact that power that is reallocated from the multicast to the unicast component also causes additional interference to the multicast signal. This reallocated power, in turn, enables unicast transmissions at higher rates without sacrificing performance of the multicast broadcast.

Figure 4:
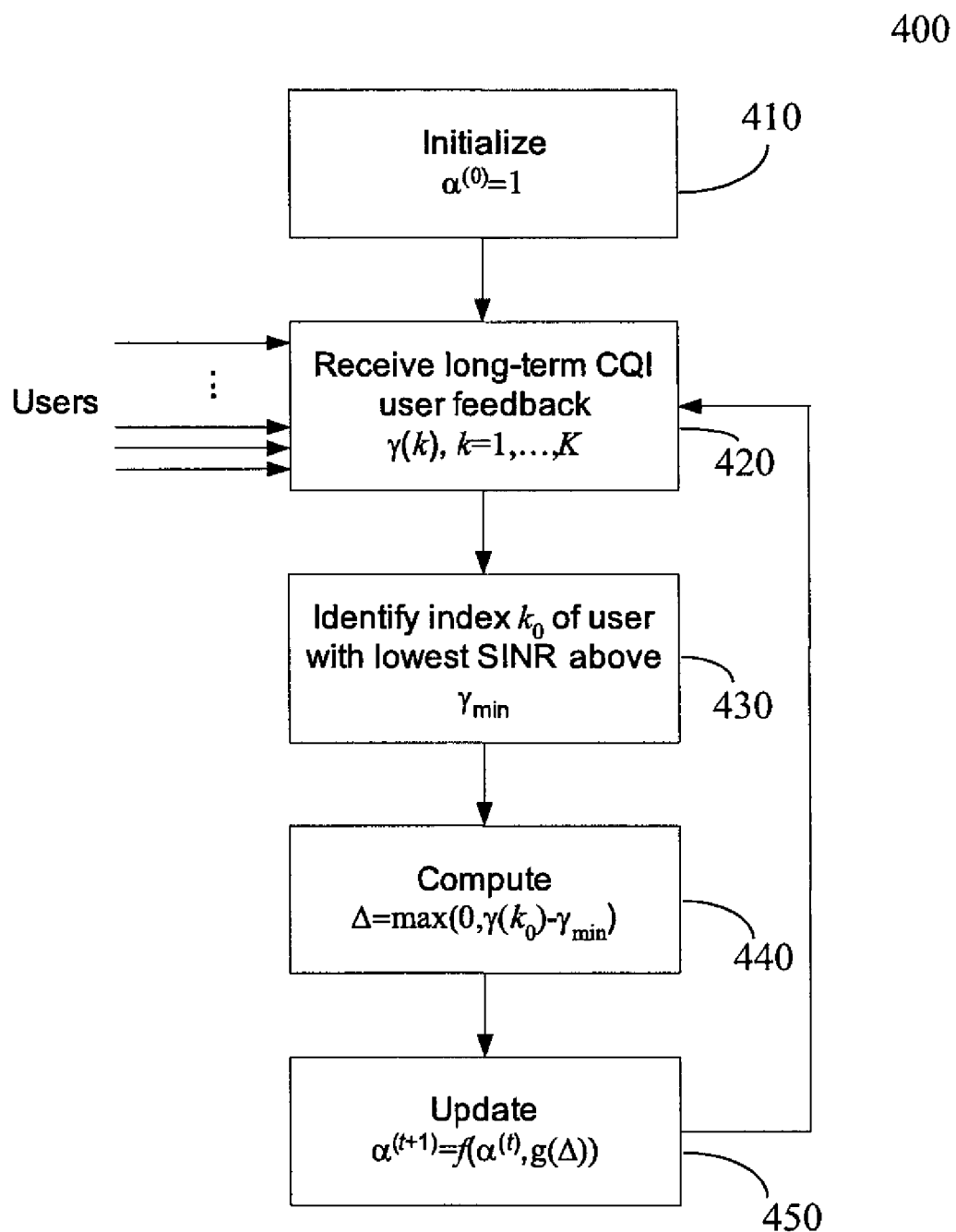
FIG. 4 conceptually illustrates one exemplary embodiment of a flow chart representation of a control routine that may be implemented to dynamically control the amount of power used to transmit multicast and unicast signals.

The aforedescribed point constitutes the basis for the proposed dynamic power allocation algorithm, whose flowchart is given in FIG. 4. In order to accommodate the iterative nature of the algorithm, $\alpha^{(t)}$ is used to index the succession of values taken by $\alpha$. Thus, the process 400 begins at block 410 with $\alpha^{(0)}$ being set equal to 1. At block 420, the base station 300 receives the long-term CQI feedback from each of the mobile devices 310 that is targeted to receive the multicast transmission. At block 430, the mobile device 310 having the worst long-term CQI is identified. In the embodiment illustrated in FIG. 4, the mobile device 310 with the lowest SINR above $\gamma_{min}$ is identified. This information is then used at block 440 to calculate the level of excess power that can be at least partially reallocated to the unicast transmission using the equation $\Delta=\max(0,\gamma(k_0)-\gamma_{min})$.

A new allocation of power between the unicast and multicast transmissions is calculated at block 450 using an update algorithm. The update algorithm could be implemented in various ways. In one embodiment of the instant invention the entire excess multicast power share may be reallocated to the unicast signal, as:

$$\alpha^{(t+1)}=\alpha^{(t)}-g(\Delta).$$

However, to avoid excessive power variations between unicast and multicast power, the updating of the available multicast power share could be filtered, using for example a low pass filter, such as a 1-tap IIR filter with "forgetting factor" $\beta$ as:

$$\alpha^{(t+1)}=(1-\beta)\alpha^{(t)}-\beta g(\Delta).$$

The choice of $\beta$ determines the aggressiveness of the power reallocation. A high $\beta$ increases the update rate of excess power reallocated to unicast, possibly at the expense of some small increase in multicast outage. Such increase can be made smaller by reducing $\beta$.

Those skilled in the art will appreciate that more generally, other types of filtering can be used, and thus the update equation may be expressed as:

$$\alpha^{(t+1)}=f(\alpha^{(t)},g(\Delta)).$$

where $f(\cdot,\cdot)$ is a generic function of two arguments.

The algorithm may be autonomously executed by each of the base stations 300 in the system. In static conditions, the value of $\alpha$ at each of the base stations 300 may then converge to a stable value. With user motion, arrivals, departures, etc., the algorithm tracks these stable values.

Those skilled in the art will appreciate that the operation of the algorithm relies only long term CQI. Hence, the mobile devices 310 may be allowed to provide only infrequent feedback regarding their respective CQIs to their respective base stations 300 in order to dynamically allocate power between the unicast and multicast transmissions. In some embodiments of the instant invention, it may be useful to employ additional fast-feedback to arrange the time/frequency multiplexing of the unicast signals and to control the corresponding unicast rates.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for supplying unicast and multicast transmissions to a plurality of mobile devices in a wireless system, comprising:

supplying, from a base station, a multicast signal using a first portion of total available power, wherein the first portion of total available power is a function of a channel quality indicator associated with at least one channel between the base station and at least one of the mobile devices;

supplying, from the base station, a unicast signal using a second portion of total available power, wherein the second portion of total available power is a function of the first portion of total available power;

monitoring variations in the channel quality indicator while supplying the multicast signal and the unicast signal; and varying the first portion and the second portion of the total available power in response to said variations in the channel quality indicator.

2. A method, as set forth in claim 1, wherein varying the first portion and the second portion of the total available power comprises varying the first portion and the second portion of total available power as a function of monitored variations in a long term channel quality indicator associated with at least one of the mobile devices.

3. A method, as set forth in claim 2, wherein varying the first portion and the second portion of the total available power comprises varying the first portion and the second portion of total available power as a function of monitored variations in the worst long term channel quality indicator associated with the mobile devices.

4. A method, as set forth in claim 1, wherein varying the first portion and the second portion of the total available power comprises varying the first portion and the second portion of total available power as a function of monitored variations in signal-to-interference-and-noise ratio associated with at least one of the mobile devices.

5. A method, as set forth in claim 4, wherein varying the first portion and the second portion of the total available power comprises varying the first portion and the second portion of total available power as a function of monitored variations in the worst signal-to-interference-and-noise ratio associated with the mobile devices.

6. A method, as set forth in claim 1, wherein varying the first portion and the second portion of the total available power comprises varying the first portion and the second portion of total available power as a function of monitored variations in a bit error rate associated with at least one of the mobile devices.

7. A method, as set forth in claim 6, wherein varying the first portion and the second portion of the total available power comprises varying the first portion and the second portion of total available power as a function of monitored variations in the worst bit error rate associated with the mobile devices.

8. A method, as set forth in claim 1, wherein varying the first portion and the second portion of the total available power comprises varying the first portion and the second portion of total available power as a function of monitored variations in a block error rate associated with at least one of the mobile devices.

9. A method, as set forth in claim 8, wherein varying the first portion and the second portion of the total available power comprises varying the first portion and the second portion of total available power as a function of monitored variations in the worst block error rate associated with the mobile devices.

* * * * *